(No Model.)

W. L. CHENEY.
LATHE.

No. 531,621. Patented Jan. 1, 1895.

WITNESSES.
Ella H. Cooper
Flora C. Tait.

Walter Lee Cheney
INVENTOR
BY Geo. L. Cooper
ATTORNEY.

United States Patent Office.

WALTER LEE CHENEY, OF MERIDEN, CONNECTICUT, ASSIGNOR TO THE MERIDEN MACHINE TOOL COMPANY, OF SAME PLACE.

LATHE.

SPECIFICATION forming part of Letters Patent No. 531,621, dated January 1, 1895.

Application filed November 6, 1893. Serial No. 490,194. (No model.)

*To all whom it may concern:*

Be it known that I, WALTER LEE CHENEY, a citizen of the United States, residing at Meriden, New Haven county, Connecticut, have invented a new and useful Improvement in Lathes, of which the following is a specification.

My invention relates to lathes used in turning or forming articles of metal, wood or other material. It is especially adapted to forming keys, drawpulls and similar articles having a shank either straight or of longitudinally irregular contour and provided with a wing, bit or lug at or near the end of said shank. It is intended to lessen the time and labor necessary to place such articles in the lathe ready for the operation required.

Figure 1:
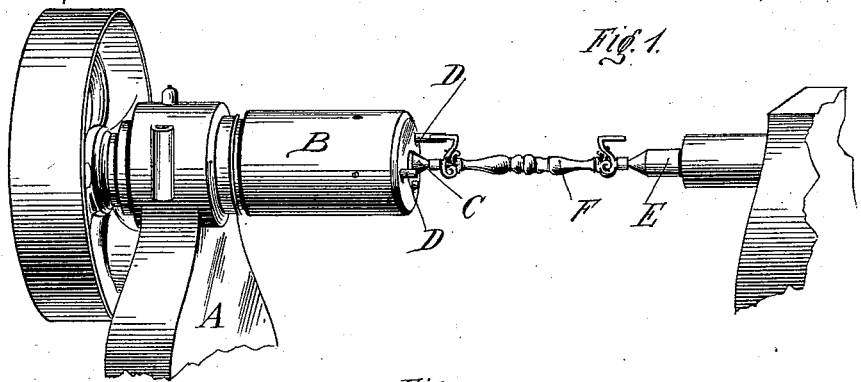
Figure 2:
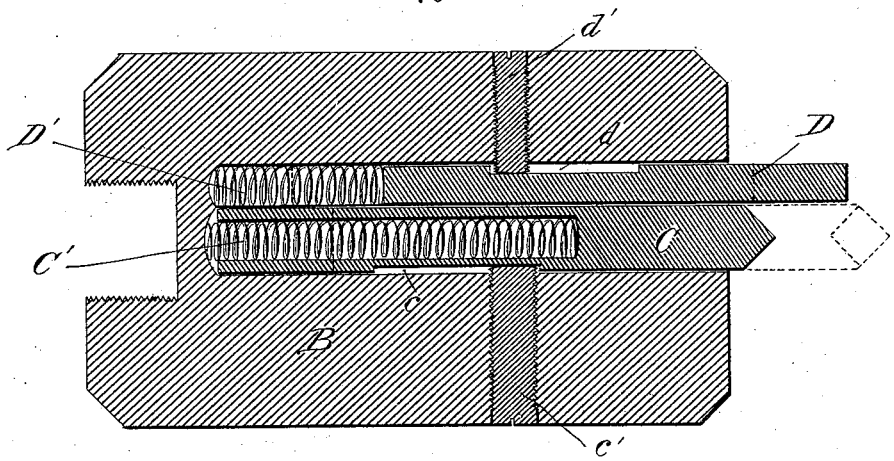
Figure 3:
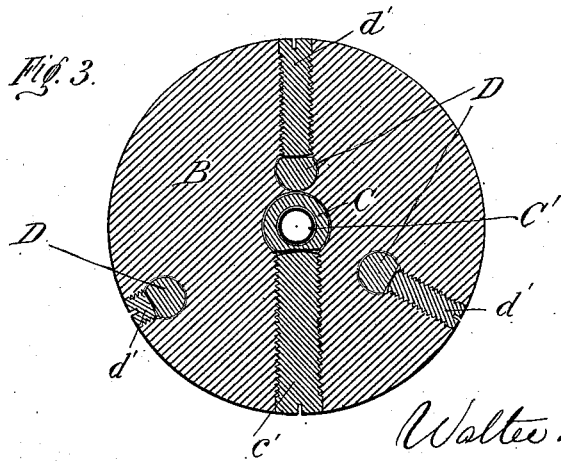

In the accompanying drawings Figure 1 represents in perspective so much of a lathe as is necessary to exhibit my invention. Fig. 2 is a central vertical section of a portion of the device shown in Fig. 1. Fig. 3 is a vertical section at right angles to that shown in Fig. 2.

The same letters refer to like parts in the several views.

A designates a lathe head stock; B, a live spindle; C, a live center in the spindle B; $c$, a longitudinal groove in the center C; $c'$, a set screw; C', a spring acting in conjunction with the live center C; D, a pin in the spindle B; $d$, a groove in the pin D; $d'$, a set screw; D', a spring actuating the pin D; E, a dead center; F, an article to be turned.

In the example of my invention illustrated in the drawings the live spindle B may be mounted on the arbor in the lathe head A in any desired manner as by means of a female screw at its rear end. The spindle B is axially bored to receive the live center C, which is of a diameter to move freely therein. As shown the center C is axially bored at its rear end to receive one end of the coiled thrust spring C the function of which is to thrust the point of the center C forward from the face of the spindle B. The longitudinal motion of the live center C is limited by the set screw $c'$ which projects into the groove $c$ in the center C. The spindle B is also bored for the reception of one or more pins D. Three of such pins are shown in the drawings at different distances from but parallel with the axis of the spindle.

As shown each of the pins D is provided at its rear end with a thrust spring D' which acts to thrust it forward beyond the face of the spindle B. The longitudinal motion of each pin D is limited by means of a set screw $d'$ projecting into a groove $d$ in the pin. The dead center E is capable of longitudinal motion toward and from the live center C. It may be so advanced and withdrawn in any well known or desired manner.

The operation of my device may be readily understood from an inspection of the drawings.

The article F to be turned may be a handle, key or other piece of metal or other material formed with a wing or lug at or near one end. The lathe is set for use by retracting two of the pins D and securing them in that position by means of their set screws $d'$. The remaining pin is thrust forward as shown in Fig. 1 and similarly secured. The choice of the actuating pin is determined by the length of the wing or lug on the article F. The article to be turned is then placed between the centers C and E. When not in use the point of the live center C projects beyond the end of the pin D as shown in dotted lines, Fig. 2. When the dead center is brought forward, i. e. to a position nearer the head A, the live center C is forced backward, the spring C' yielding to the pressure of the operating lever or the like by which the dead center is moved. As the article F is brought nearer to the face of the spindle B its wing is struck by the pin D as shown in Fig. 1 and forced to rotate with the spindle. After the operation of turning or forming is completed the dead center E is retracted by the operator, the spring C' forces the live center C and the article F to follow until the wing on the article F is clear of the pin D. The article may then be easily taken from the lathe or by a further retraction of the dead center E allowed to drop through the lathe frame into a suitable receptacle. Another article may then be introduced as before. It will be observed that there is no necessity of or advantage in stopping the lathe either to insert or to remove the work.

It has heretofore been customary to secure work of the class described for turning by means of a two jawed chuck on the live spindle. This necessitated the stopping of the lathe to remove each piece of work, the opening of the chuck by means of a wrench or key, the careful adjustment of the next article, the closing of the jaws and the starting of the lathe. This series of operations often requires very much more time than the turning or forming of the work, while in my device the "chucking" or placing of the work in position is the work of a moment only. Where it is inconvenient or disadvantageous to countersink the ends of the article to be turned the centers C and E or either of them may be cupped as indicated in dotted lines, Fig. 2.

Means other than those indicated may be employed for actuating the centers or the pins and many mechanical alterations may be made without departing from my invention. Thus instead of one or more pins the face or end of the spindle may be so formed as to engage with the article to be turned so as to secure its rotation with the spindle. Again the live center C and a pin D may be so connected as to act reciprocally, i. e. one being automatically retracted as the other is protruded.

What I claim as my invention, and desire to secure by Letters Patent of the United States, is as follows:

1. In a lathe in combination a spindle, a center projecting from the free end of said spindle and capable of limited longitudinal motion therein and a retractible pin or projection in the free end of said spindle, substantially as described.

2. In a lathe in combination a spindle, a center projecting from the free end of said spindle and capable of limited longitudinal motion therein, a retractible pin or projection in the free end of said spindle and means as a spring for protruding said pin from said spindle, substantially as described.

WALTER LEE CHENEY.

Witnesses:
GEO. L. COOPER,
IRVING I. GARDNER.